Sept. 26, 1950  F. N. JODRY  2,523,764
LUBRICATING DEVICE FOR ELEVATOR DRIVE MECHANISMS
Filed July 27, 1946  4 Sheets-Sheet 1
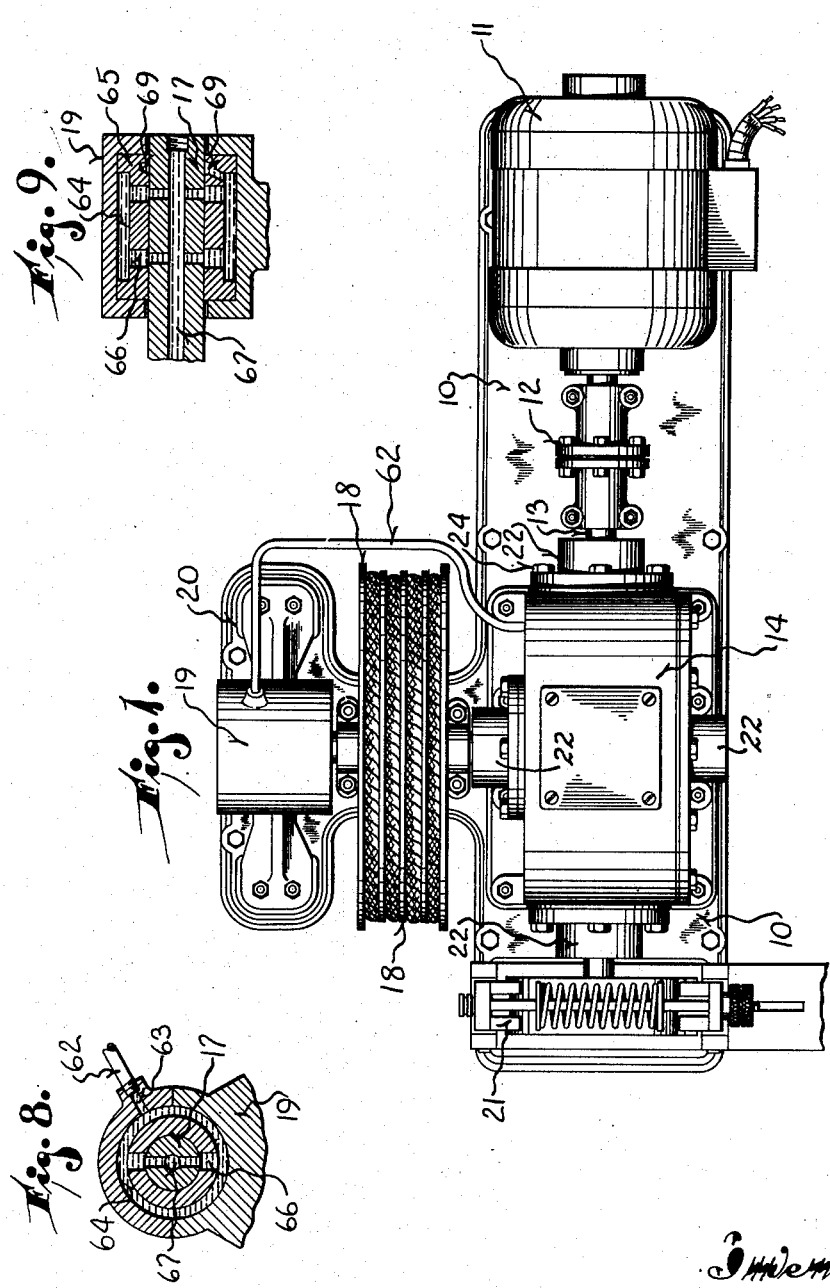
Inventor
Frederic N. Jodry Sept. 26, 1950          F. N. JODRY          2,523,764
LUBRICATING DEVICE FOR ELEVATOR DRIVE MECHANISMS
Filed July 27, 1946          4 Sheets-Sheet 2
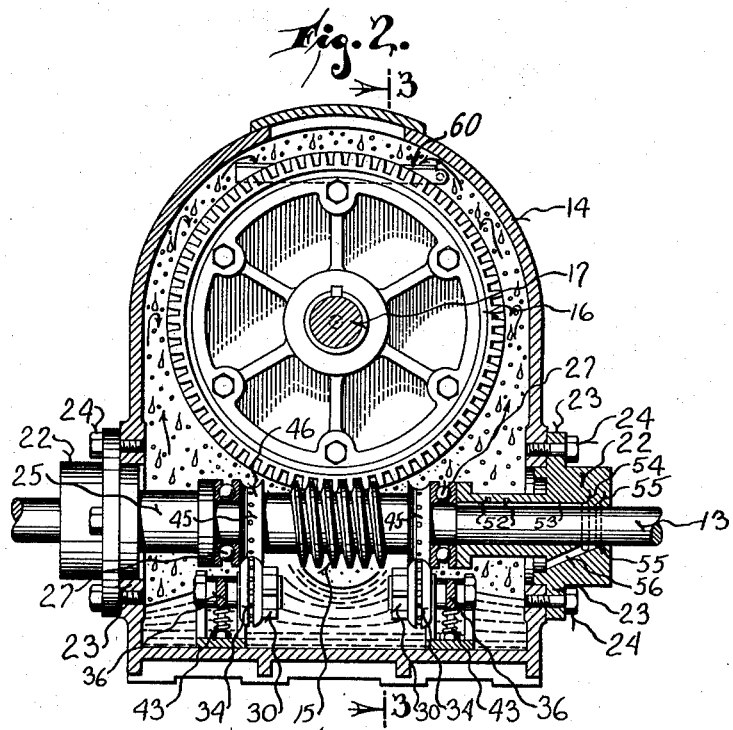
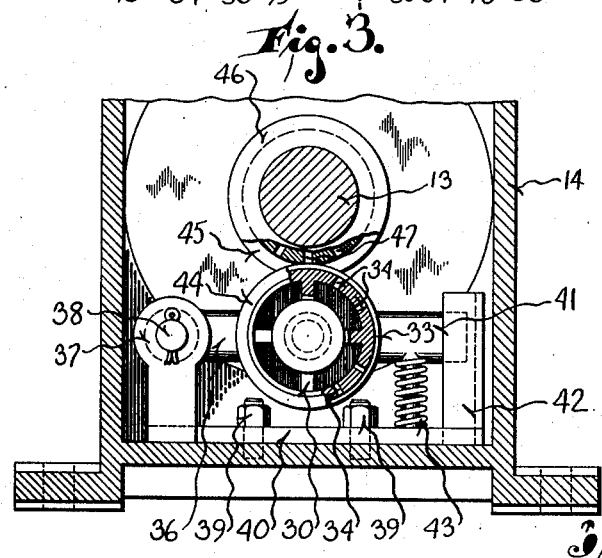

Sept. 26, 1950     F. N. JODRY     2,523,764
LUBRICATING DEVICE FOR ELEVATOR DRIVE MECHANISMS
Filed July 27, 1946     4 Sheets-Sheet 3
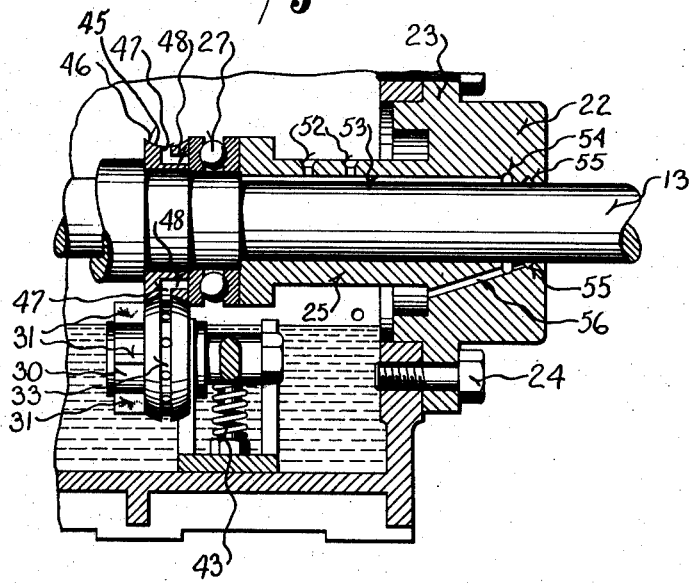
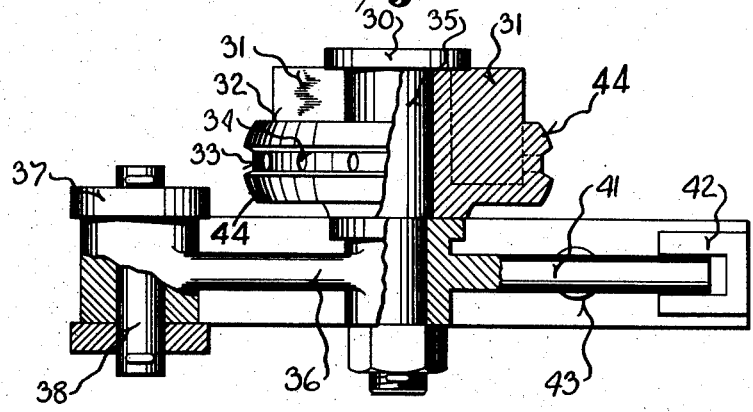
Inventor
Frederic N. Jodry Sept. 26, 1950 F. N. JODRY 2,523,764
LUBRICATING DEVICE FOR ELEVATOR DRIVE MECHANISMS
Filed July 27, 1946 4 Sheets-Sheet 4
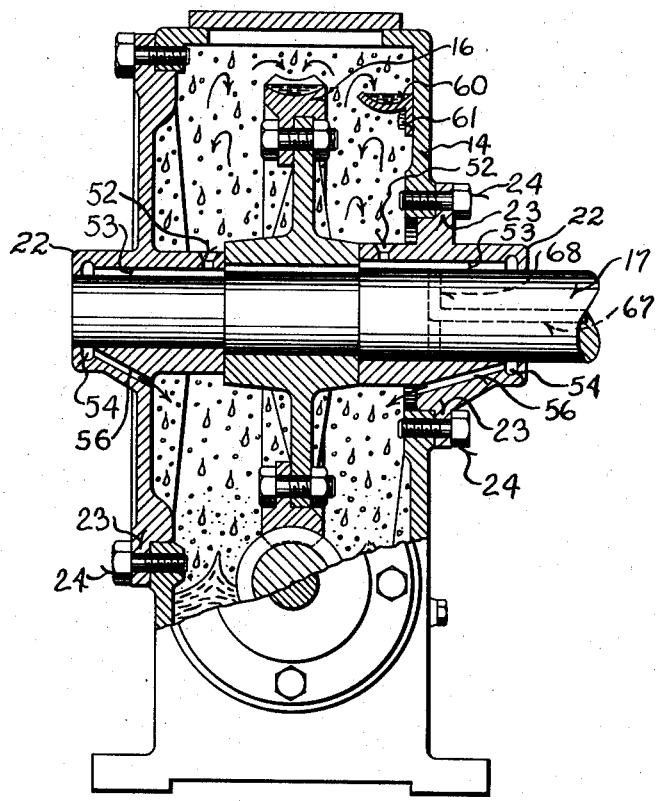
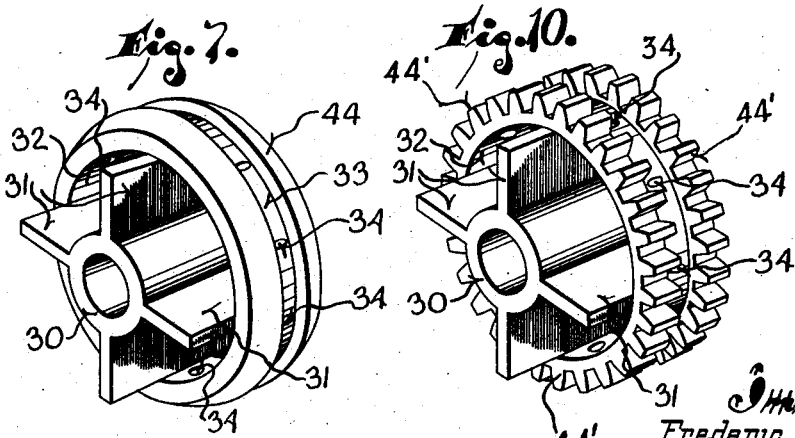
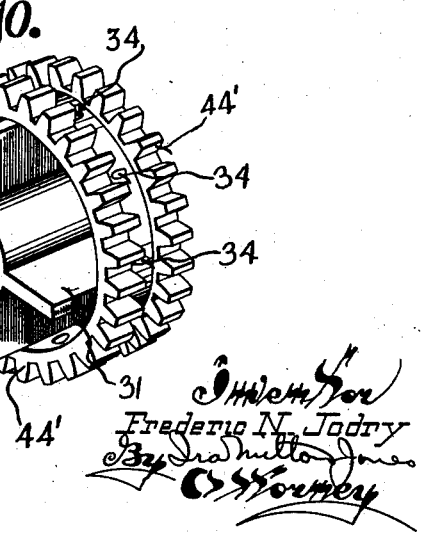
Inventor
Frederic N. Jodry Patented Sept. 26, 1950

2,523,764

UNITED STATES PATENT OFFICE 2,523,764

LUBRICATING DEVICE FOR ELEVATOR DRIVE MECHANISMS

Frederic N. Jodry, Montreal, Quebec, Canada, assignor of thirty per cent to John W. Speaker, Milwaukee, Wis., and fifteen per cent to Markus Henry Moss, Montreal, Quebec, Canada Application July 27, 1946, Serial No. 686,678
In Canada February 12, 1946

5 Claims. (Cl. 184—11)

This invention relates to lubricating means and more particularly to means for lubricating the cable driving mechanism of elevators and similar power transmissions.

Elevator cable driving mechanism essentially consists of a housing in which a drive shaft, and an arbor are supported. A worm on the drive shaft coacts with a worm gear on the arbor to effect rotation of the latter and actuation of the cable drum mounted thereon. Mechanism of this type and nature must of necessity, be properly lubricated during operation.

The present invention is designed to positively distribute lubricant to all parts of the driving mechanism encased within the housing. This is accomplished by means of impellers which are caused to rotate in a bath of lubricant contained within the transmission housing and which agitate the lubricant to such an extent that the interior of the said housing is constantly filled with a vapor-like atmosphere consisting of mist-like particles of lubricant. The moving parts are accordingly subjected to continuous lubrication while in operation. In addition drilled passages are provided throughout the mechanism with advantageously located openings to retain and direct part of the constantly falling oil globules to the surfaces under frictional engagement.

The invention additionally contemplates extremely effective lubrication of the essential ball thrust bearings which are lubricated under pressure from the impellers by means of channels in a shouldered formation of the drive shaft which communicate with openings in the impeller periphery and debouch the lubricant onto the bearings.

Another important result of the violent agitation of the oil secured with this invention is that the myriad globules, broken from the mass, are in contact with the air in the most efficient manner, to effect maximum cooling of the oil. This is of utmost importance, particularly when the mechanism is operating under warm conditions. It has been found that as a result of this agitation, it has been possible to lower the operating temperature of the oil to that of the surrounding atmosphere or even slightly below in some cases.

Still another object of the invention is to provide effective oil seals to prevent excessive loss of the lubricant which ordinarily would result from the extreme turbulence within the housing and the constant mist produced by the impellers.

With the above and other objects in view, which will appear as the description proceeds, this invention resides in the novel construction and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a plan view of a typical elevator drive;

Figure 2 is a vertical sectional view taken through the housing on the plane of the worm gear;

Figure 3 is a fragmentary, vertical sectional view taken through the housing on the plane of the line 3—3 in Figure 2;

Figure 4 is a fragmentary sectional view of the housing illustrating the drive shaft associated with one impeller in detail;

Figure 5 is a plan view, with parts broken away and in section of one impeller assembly;

Figure 6 is a vertical sectional view through the housing showing the worm gear in section;

Figure 7 is a perspective view of one of the impellers;

Figure 8 is a transverse sectional view of the arbor and outer bearing thereof;

Figure 9 is a sectional view taken axially through the arbor and outer bearing; and Figure 10 is a perspective view of a modified form of impeller.

Referring more in detail to the drawings in which like reference characters designate corresponding parts throughout the several views, it will be seen that the improved lubricating means is particularly adaptable to an elevator drive, an example of which is shown in Figure 1. The drive illustrated is mounted on a base 10, and includes a motor 11 coupled at 12 to a drive shaft 13. A housing 14, encloses the drive mechanism which essentially consists of a worm 15 on the shaft 13, and a worm gear 16 on an arbor 17. The arbor 17 carries a cable drum 18 medially of its ends and is journalled at its outer end in an outboard bearing 19 carried by an extension 20 of the base. A conventional braking apparatus 21 is incorporated in the drive.

The drive shaft 13 is supported in bearings 22, each of which has a shouldered flange 23 bolted as at 24 to the housing. The bearings 22 have projecting extensions 25 into the housing to form seats for thrust bearings 27 which receive the thrust of the worm 15. The worm meshes with the worm gear 16, and thereby drives the arbor 17, on which the cable drum 18 is secured. The arbor 17 is likewise supported by bearings 22 similarly provided with shouldered flanges 23 through which bolts 24 pass to secure the said bearings to the housing. It will be noted that one arbor bearing is sufficiently large to effect installation of the worm gear 16.

The lubricating means proper comprises, primarily, a pair of impellers 30 each consisting of blades 31, which project from the inside of a cup-like formation 32. This cup-like formation has a convex periphery provided with a central, perimetral channel 33 from which holes 34 lead to afford communication between the channel and the inside of the cup-like formation. Each impeller is mounted on a stud 35, and is freely rotatable thereon. The studs 35 are fixedly secured to arms 36, which are pivoted at one end to upstanding clevises 37, by pins 38.

The clevises are bolted at 39, through a base plate 40 of which the clevis forms an integral part. The opposite end 41 of each arm 36 is movable between guides 42 formed integrally with the base plate 40. A coil spring 43 interposed between the guided end of each arm 36 and the base plate 40 urges the arm upwardly.

The impellers are mounted below the shaft 13 in such positions that their convex peripheries 44 engage with concave peripheries 45 of shouldered enlargements or formations 46 on the drive shaft 13. Each enlargement or shouldered formation 46 is adjacent to the inner race of one of the thrust bearings 27. The springs 43 act to urge the impellers against the shouldered enlargements to effect frictional engagement between the coacting surfaces of the two, to the end that the impellers will revolve at a speed commensurate with the speed of rotation of the shaft 13, although it is within the spirit of the invention to provide teeth 44' on the impellers 30 as shown in Figure 10 to mesh with similar teeth on the enlargements. The enlargements 46 are drilled radially to provide a plurality of holes 47, which connect with corresponding axial holes 48, debouching on the side of the enlargements adjacent to the thrust bearings.

The two impellers are thus caused to revolve in the oil contained in the bottom of the housing, the blades 31 throwing the oil upward throughout the interior of the housing in the form of fine droplets or vapor so that the moving parts of the mechanism are entirely and continuously surrounded in a lubricating, vaporous bath. The oil filler is so disposed in the housing as to keep the oil level below the shaft 13 when the mechanism is at rest.

Those parts of the blades which are disposed within the cup direct, by centrifugal force, a large portion of the oil into the holes 34 and thence into the drilled passages in the shouldered enlargements 46 from which it is steadily thrown outwardly and upwardly into the interior of the housing in the form of a spray. Hence the enlargements 46 cooperate with the blades 31 to create an intense oil vapor or mist within the housing for thorough lubrication of the moving parts.

As the vapor referred to condenses it falls to the bottom of the housing and part of the falling oil droplets are caught in openings 52 formed in the top of the bearing extensions 25 from which the oil thus caught flows into chambers 53 milled into the bearings to lubricate the shaft 13. The chambers 53 terminate in annular channels 54 formed in the bearings near their outer ends. These channels 54 together with smaller and more outwardly disposed annular channels 55 communicate with oil return passages 56.

The bearings for the arbor 17 are similarly provided with openings 52 which communicate with chambers 53, each of which is provided at its outer end with an annular channel 54 in communication with an oil return passage 56.

The outboard bearing is lubricated by means of an inclined trough 60 (see Figure 6) secured at 61 to the housing, which discharges the oil through an exterior duct 62 to the said bearing. A passage 63 in communication with the line 62, directs the oil into a circumferential chamber 64 (Figure 9) formed between the bearing 19 and a bearing sleeve 65 in which the arbor rotates. Ports 66 in the bearing sleeve in communication with the chamber 64 open onto the arbor to lubricate the same.

The arbor is bored longitudinally as at 67 and is provided with radially disposed holes which intermittently align with the ports 66 as it rotates, to drain off the excess oil through the bore 67 and by way of a radially disposed extension 68 at the inner extremity of the bore 67 discharges this excess oil into the chamber 53 of the adjacent bearing 22 from which it returns via the oil outlet 56 into the housing as hereinbefore described. An annular groove 69 in the bearing sleeve 65 acts to prevent excessive oozing of oil between the arbor and the sleeve.

From the foregoing description taken in connection with the accompanying drawings, it will be readily apparent that this invention provides means for effectively lubricating the shaft 13 and the arbor 17 while preventing loss of oil at the bearing points; that the oil return passages retain the oil within the housing, and that by centrifugal force, produced by rotation of the impellers, a tendency exists to draw the oil away from the bearings 25 when in action.

What I claim as my invention is:

1. Lubricating means for power transmissions comprising: a housing containing a lubricant supply; means for agitating the lubricant supply so as to substantially fill the housing with a lubricating mist; bearings in the housing; a bearing remote from the housing bearings; a shaft supported in said bearings; a trough in the housing adapted to catch and accumulate lubricant from the mist condensing on surfaces above the trough; a conduit leading from the trough to the remote bearing; and an oil return passage in the shaft leading from the remote bearing back to the housing.

2. Lubricating means for power transmissions comprising: a housing containing a supply of oil; a drive shaft rotatably journalled in bearings carried by the housing; an impeller rotatable in said supply of oil, said impeller including a plurality of radial blades and a ring encircling and partially enclosing said blades, said ring having radial apertures therein whereby rotation of the impeller causes oil to be forced through the apertures in the ring and to be sprayed from said apertures outwardly and upwardly into the interior of the housing along with oil acted upon by the unenclosed portions of the blades to fill the housing with lubricating oil droplets and vapor; and a shouldered formation on the drive shaft engaged with the periphery of said ring to rotate the impeller.

3. The lubricating means set forth in claim 2 wherein said shouldered formation has radial apertures in its periphery into which oil is transferred by said ring, the lubricant in said apertures of the shouldered formation likewise being sprayed outwardly and upwardly in the housing by rotation of the drive shaft to thus contribute to the spray lubrication of parts within the housing.

4. Lubricating means for power transmissions comprising: a housing containing a supply of oil; a horizontal drive shaft journalled in bearings carried by the housing for rotation above the level of oil in the housing; a collar on the drive shaft having radial wells opening to its periphery; and an impeller mounted for rotation partially in the supply of oil and on an axis parallel to but beneath the drive shaft, said impeller including a ring having its periphery engaged with the periphery of said collar to afford a rotation transmitting connection between the drive shaft and the impeller, and radial blades fixed inside said ring and projecting out of the ring to one side thereof, said ring having radial holes therein through which oil is forced by the blades during rotation of the impeller for transfer to the wells in the collar, whereby oil is sprayed upwardly and outwardly into the interior of the housing by the collar, the ring and the projecting portions of the blades carried by the ring during rotation of the impeller to thoroughly spray-lubricate moving parts in the housing.

5. Lubricating means for power transmissions comprising: a housing containing a supply of oil; a shaft journalled in bearings carried by the housing for rotation on a horizontal axis and at a level above the level of oil in the housing; a collar on the shaft having wells opening to its periphery; and an impeller mounted for rotation beneath the drive shaft on an axis parallel thereto and with the impeller partially submerged in the supply of oil, said impeller including a ring having a plurality of radial holes therein, and said ring having its periphery drivingly engaged with the periphery of the collar to afford a rotation transmitting connection between the shaft and the impeller; and means carried by said ring for forcing oil out through the radial holes therein for transfer to the periphery of the collar and into the wells of the collar so that the oil transferred into said wells is sprayed outwardly and upwardly into the interior of the housing by rotation of the shaft.

FREDERIC N. JODRY.

REFERENCES CITED

The following references are of record in the file of this patent:

UNITED STATES PATENTS

| Number | Name | Date |
| --- | --- | --- |
| 358,583 | Timms | Mar. 1, 1887 |
| 1,151,732 | Steedman | Aug. 31, 1915 |
| 1,402,281 | Brockway | Jan. 3, 1918 |
| 1,271,140 | Dickey | July 2, 1918 |
| 1,585,725 | Lauterbur | May 25, 1926 |
| 1,628,212 | Winterer | May 10, 1927 |
| 1,680,871 | Gardner | Aug. 14, 1928 |
| 1,727,016 | McCray | Sept. 3, 1929 |
| 1,808,792 | Schellens | June 9, 1931 |
| 2,107,219 | Schenk | Feb. 1, 1938 |
| 2,183,667 | Buckendale | Dec. 19, 1939 |

FOREIGN PATENTS

| Number | Country | Date |
| --- | --- | --- |
| 616,381 | France | Oct. 29, 1926 |